United States Patent [19]

Mahlmann

[11] 4,053,652

[45] Oct. 11, 1977

[54] ROASTED AND GROUND COFFEE PRODUCT AND METHOD

[75] Inventor: James P. Mahlmann, Wayne, N.J.

[73] Assignee: General Foods Corporation, White Plains, N.Y.

[21] Appl. No.: 607,320

[22] Filed: Aug. 25, 1975

[51] Int. Cl.² .............................................. A23F 1/04
[52] U.S. Cl. ..................................... 426/388; 241/2; 241/6; 426/455; 426/466; 426/518
[58] Field of Search .............. 426/595, 388, 459, 460, 426/461, 464, 455, 466, 518; 241/2, 6, 30

[56] References Cited

U.S. PATENT DOCUMENTS

| | | | |
|---|---|---|---|
| 3,544,331 | 12/1970 | Hair | 426/388 |
| 3,660,106 | 5/1972 | McSwiggin | 426/595 X |
| 3,700,462 | 10/1972 | Stefanucci | 426/388 X |
| 3,715,215 | 2/1973 | Balling et al. | 426/460 |
| 3,725,076 | 4/1973 | Stefanucci et al. | 426/388 |
| 3,780,197 | 12/1973 | Stefanucci et al. | 426/388 X |

Primary Examiner—Frank W. Lutter
Assistant Examiner—N. Greenblum
Attorney, Agent, or Firm—Thomas R. Savoie; Bruno P. Struzzi; Daniel J. Donovan

[57] ABSTRACT

A novel roasted and ground coffee product having a unique appearance is produced by roasting a first coffee fraction to a first roast color and water quenching said roasted beans to a relatively high moisture level, separately roasting a second coffee fraction to a second, discernibly different roast color and water quenching said roasted beans to a relatively low moisture level. The two roasted coffee bean fractions are then blended together and ground, producing a coffee product having a speckled appearance wherein the average particle size of the high-moisture fraction is at least 300 microns larger than the average particle size of the low-moisture fraction.

8 Claims, No Drawings

ROASTED AND GROUND COFFEE PRODUCT AND METHOD

BACKGROUND OF THE INVENTION

The appearance of a roasted and ground coffee product is usually considered by the consumer in his evaluation of the coffee product. Some comsumers are known to prefer a roasted and ground coffee product which has a non-homogeneous or speckled color appearance. Some of these consumers also prefer a roasted and ground coffee product that also has a distinctly non-homogeneous particle size distribution.

It is of course recognized that passing whole roasted coffee beans through a commercial coffee mill does not produce all uniformly sized particles but rather yields a particle size distribution which generally approximates a bell-shaped curve. However, the particle size character of coffee products which are prepared by grinding a blend of whole roasted coffee beans is generally regarded as uniform. For the purpose of this invention, a non-homogeneous or non- uniform particle size distribution will be a product which has a plurality preferably two of roast color fractions with the average particle size of two different fractions differing by more than 300 microns. Preferably the average particle size difference will be at least 500 microns.

It is of course possible to separately grind different fractions of whole roasted coffee beans to two or more distinct particle sizes, and this type of procedure is disclosed in U.S. Pat. No. 3,544,331 to Hair. Separate grinding, however, involves duplicative processing steps and probably duplicative grinding equipment, and this procedure could prove to be unfeasible or economically prohibitive in some existing coffee roasting facilities. It would therefore be desirable to produce a non-uniform particle size distribution without adding additional processing steps or equipment.

Conventional practice for using separately roasted and quenched coffees have heretofore either combined the roasted beans prior to grinding or else separately ground the roasted beans and combined the ground coffee. In those cases where the roasted coffee fractions are combined prior to grinding, the roasted coffee beans have heretofore contained comparable levels of moisture and the resulting product has a uniform particle size distribution among the fractions. In those cases where the roasted coffee fractions are combined after grinding, it is known, as shown in the aforementioned Hair patent, to produce non-uniform particle size distributions.

Although high moisture levels have previously been disclosed (U.S. Pat. No. 3,482,987) for use in quenching lower grade roasted coffees, this patent discloses that these high-moisture beans must be dried prior to use in a roasted and ground coffee product.

DESCRIPTION OF THE INVENTION

It has been found that two or more fractions of whole roasted coffee beans which have significantly different moisture contents can be blended together and ground to produce a roasted and ground coffee product having a non- uniform particle size distribution. This invention is particularly adapted for use in those coffee processes wherein different blends and/or types of coffees are separately roasted to distinctly different roast colors and then, subsequently, separately quenched.

This invention will be described in terms of two separately roasted and quenched coffee bean fractions which are combined prior to grinding; however, as will be recognized by those skilled in the art, this invention is also applicable to combining more than two separately roasted and quenched coffee bean fractions prior to grinding.

Since the overall or average moisture content of a roasted and ground coffee product affects the stability of the product, the total amount of moisture of the composite coffee product of this invention should not exceed the 3 to 5% moisture by weight found in current commercial practice. Thus, if the high-moisture coffee bean fraction having a water content of 8% by weight is to be combined with an equal weight of a low-moisture fraction, the moisture content of the low-moisture fraction should preferably not exceed about 2% by weight.

Since the prime object of this invention is to produce a distinctly different appearance over conventional roasted and ground coffee products, it will be necessary that both the high and low moisture fractions which are combined constitute at least 10%, and preferably at least 15%, by weight of the total blend. The visual effect of non-uniform particle size distribution will be most apparent when roasted coffee bean fractions possess discernibly different roast colors. Thus, according to this embodiment of the invention, the component fractions present in the roasted and ground coffee product will differ among themselves not only in average particle size but also in color.

According to one embodiment of this invention, a low-grade coffee fraction is roasted to a lighter roast color (as is conventional) and quenched to a relatively high moisture level, and a high-grade coffee fraction is roasted to a darker roast color and then quenched to a relatively low moisture content. In this manner, after blending and grinding the fractions, the low-grade coffee fraction will appear as light-colored, large particles within the roasted and ground coffee product. As will be recognized by those skilled in the art, both the light roast color and coarse particle size of the low-grade fraction serve to minimize the flavor contribution of this fraction to the brewed coffee beverage. It would also be possible, however, to dark roast and high-moisture quench a low-grade coffee fraction so that the coarse particles appearing in the roasted and ground coffee product are dark in color.

It has been found that the non-uniform particle size distribution desired by this invention can be obtained if, prior to grinding, a roasted coffee bean fraction having a moisture content of from 0% to 4% by weight moisture is combined with a roasted coffee bean fraction having a moisture content of from 7% to 20%. Beans having moisture contents in excess of about 20% by weight are to be avoided since grinding of these beans would be troublesome.

Low-moisture roasted beans may be readily produced, as recognized by those skilled in the art, by limiting the amount of quenching water supplied to the roasted beans exiting the roaster and/or by the use of non-aqueous quenching mediums such as cooled or liquefied gases. High-moisture roasted beans are readily produced by quenching the roasted beans exiting the roaster with a relatively large amount of water, or by adding moisture to previously quenched beans.

Preferably, the high-moisture beans are retained or held, at ambient or elevated temperature, for a period of time after moisture addition in order to allow the moisture to equilibrate or be absorbed throughout the beans. Care must be taken, however, to avoid a loss of moisture from high moisture beans during any hold-up period. Use of a closed atmosphere having a high relative humidity may be required to maintain a high moisture level within the beans. It has been found for example, that, in order to maintain a moisture content in roasted coffee of approximately 10%, the minimum relative humidity that must be maintained at 75° F is about 65%.

This invention is further described and illustrated by the following example wherein all percent numbers express weight percent and wherein roast color numbers are obtained as set forth in U.S. Pat. No. 3,700,462, herein incorporated by reference.

EXAMPLE

Two forty pound fractions of green coffee were roasted to two different roast colors and water quenched to two different levels as follows: Fraction A consisting of 70% Colombians, 23.6% Brazils and 6.4% Africans were roasted to a relatively dark roast color of 58 and quenched with 0.6 gallons of water by means of a water spray. Fraction B consisting of 100% Africans was roasted to a light color of 120, and quenched with 1.49 gallons of water by means of a water spray. Each fraction, after 7 minutes cooling, was sealed in separate poly drum liners. After 4 hours, 34 lbs. of Fraction A having a moisture content of 3.1% by weight, and 6 lbs. of Fraction B, having a moisture content of 10.5% by weight were mixed for three minutes. The mix (4.5% H$_2$O) was then passed through a Gump Mill grinder yielding a roasted and ground coffee product having an overall average particle size of 1,000 microns, with Fraction A having an average particle size of 920 microns and Franction B having an average particle size of 1465 microns. The screen analysis for the blend and separate fraction was as follows, mesh size referring to U.S. Standard Sieve:

| MESH | BLEND | FRACTION A | FRACTION B |
|---|---|---|---|
| On 8 | 1.1 | 0 | 6 |
| On 12 | 4.8 | 1.0 | 22 |
| On 16 | 21.6 | 15.0 | 48 |
| On 20 | 32.9 | 43.0 | 12 |
| On 30 | 21.9 | 23.0 | 12 |
| On 40 | 5.8 | 10.0 | 12 |
| Thru 40 | 11.8 | 8.0 | 12 |

I claim:
1. A method for producing a roasted and ground coffee product comprising the steps of:
   a. separately roasting a first fraction of green coffee beans,
   b. quenching the first roasted bean fraction to a moisture content of 0% to 4% by weight,
   c. separately roasting a second coffee bean fraction,
   d. quenching the second roasted bean fraction to a moisture content of 7% to 20% by weight, thereafter,
   e. combining the fractions of steps b) and d) to obtain a roast coffee bean blend comprised of at least 10% by weight of each fraction, and
   f. grinding said roast coffee bean blend, whereby a ground coffee product having a non-uniform particle size distribution is obtained, the average particle size of the first or low-moisture fraction being at least 300 microns smaller than that of the second or high-moisture fraction.

2. The method of claim 1 wherein the ground product resulting from step f) has an overall moisture content of from 3 to 5% by weight.

3. The method of claim 1 wherein the second coffee bean fraction is roasted to a discernible darker roast color than the first fraction.

4. The method of claim 3 wherein the second coffee bean fraction is a lower grade coffee fraction and the first coffee bean fraction is a higher grade coffee fraction.

5. The method of claim 1 wherein the second coffee bean fraction is roasted to a discernibly lighter roast color than the first fraction.

6. The method of claim 5 wherein the second coffee bean fraction is a lower grade coffee fraction and the first coffee bean fraction is a higher grade coffee fraction.

7. The method of claim 1 wherein the first or low-moisture fraction has an average particle size at least 500 microns smaller than the second or high-moisture fraction.

8. The method of claim 7 wherein the ground product resulting from step f) has an overall moisture content of from 3 to 5% by weight.

* * * * *